US009611099B2

(12) United States Patent
Watters

(10) Patent No.: US 9,611,099 B2
(45) Date of Patent: Apr. 4, 2017

(54) MATERIAL PROCESSING APPARATUS WITH DEPLOYABLE FEED CONVEYOR

(71) Applicant: Terex GB Limited, Dungannon, County Tyrone (GB)

(72) Inventor: Paul Watters, Cookstown (GB)

(73) Assignee: Terex GB Limited, Dungannon, Country Tyrone (GB)

( * ) Notice: Subject to any disclaimer, the term of this patent is extended or adjusted under 35 U.S.C. 154(b) by 159 days.

(21) Appl. No.: 14/151,085

(22) Filed: Jan. 9, 2014

(65) Prior Publication Data

US 2014/0202835 A1 Jul. 24, 2014

(30) Foreign Application Priority Data

Jan. 18, 2013 (GB) .................................. 1300900.6

(51) Int. Cl.
*B65G 21/14* (2006.01)
*B65G 21/12* (2006.01)
*B02C 23/02* (2006.01)
*B02C 21/02* (2006.01)

(52) U.S. Cl.
CPC .............. *B65G 21/12* (2013.01); *B02C 21/02* (2013.01); *B02C 23/02* (2013.01); *B65G 21/14* (2013.01)

(58) Field of Classification Search
CPC .............................. B65G 21/14; B65G 41/002
USPC ......................... 198/632, 312, 313, 315, 812
See application file for complete search history.

(56) References Cited

U.S. PATENT DOCUMENTS

| | | | | |
|---|---|---|---|---|
| 727,315 | A * | 5/1903 | Fridman | H01H 35/2635 337/313 |
| 5,676,320 | A | 10/1997 | Merklinger | |
| 5,878,967 | A | 3/1999 | Conner | |
| 7,264,104 | B2 * | 9/2007 | Heeszel | B02C 21/02 198/314 |
| 2003/0226919 | A1 | 12/2003 | Brock et al. | |
| 2006/0202073 | A1 | 9/2006 | Heeszel et al. | |
| 2008/0041984 | A1 * | 2/2008 | Sauser | B02C 21/02 241/75 |
| 2009/0057449 | A1 | 3/2009 | Forte et al. | |
| 2010/0282568 | A1 | 11/2010 | Whyte et al. | |

FOREIGN PATENT DOCUMENTS

| | | |
|---|---|---|
| WO | 9512462 | 5/1995 |
| WO | 2004018106 A1 | 3/2004 |

* cited by examiner

*Primary Examiner* — Leslie A Nicholson, III
*Assistant Examiner* — Lester Rushin
(74) *Attorney, Agent, or Firm* — Warner Norcross & Judd LLP

(57) ABSTRACT

A material processing apparatus comprising a body, and a conveyor that is movable between a deployed state and a transport state. The conveyor comprises a feed end, a discharge end and conveying means configured to carry material from the feed end to the discharge end. The discharge end is coupled to the body and, in the deployed state, the conveyor extends from the body with the feed end being spaced apart from the body by the conveying means. In the transport state, the conveyor is folded with respect to the body.

19 Claims, 5 Drawing Sheets

MATERIAL PROCESSING APPARATUS WITH DEPLOYABLE FEED CONVEYOR

FIELD OF THE INVENTION

The present invention relates to feed conveyors for material processing apparatus, particularly aggregate processing apparatus. The invention relates particularly but not exclusively to deployable feed conveyors.

BACKGROUND TO THE INVENTION

Commonly, material to be processed is fed to a hopper or conveyor located at an end of a material processing apparatus. After processing, the material may be discharged via one or more discharge conveyors located at a side, or the other end, of the machine. It can be advantageous to feed material to the machine from the side, for example in situations where material is being recirculated between two machines that are side-by-side. This can be achieved using a discharge conveyor from an adjacent machine and/or by installing a separate conveyor. Installation of a separate conveyor can be time consuming and require not only means for transporting the separate conveyor but also a crane to facilitate its installation. More generally, it can be advantageous to provide a material processing apparatus with a variety of different conveyors for feeding material to or discharging material from the apparatus. It can be difficult to fit such conveyors onto apparatus since space is usually limited and since they need to be foldable in a manner suitable for transport.

It would be desirable to provide an improved material processing apparatus in which at least some of the above problems are mitigated.

SUMMARY OF THE INVENTION

A first aspect of the invention provides a material processing apparatus comprising a body, and a conveyor that is movable between a deployed state and a transport state, wherein the conveyor comprises a feed end, a discharge end and conveying means configured to carry material from said feed end to said discharge end, and wherein said discharge end is coupled to said body and, in said deployed state, said conveyor extends from said body with said feed end being spaced apart from said body by said conveying means and, in said transport state, said conveyor is folded with respect to the body.

Typically, in said transport state at least part of said conveyor is located on top of said body.

In some embodiments, said body includes at least one material processing apparatus and wherein, in the deployed state, said discharge end is positioned over at least one of said at least one material processing apparatus in order to discharge material to said at least one of said at least one material processing apparatus.

Optionally, said conveyor comprises and end section that is foldable with respect to a main section and wherein, when said conveyor is in said deployed state, said end section is in an unfolded state and, when said conveyor is in said transport state, said end section is in a folded state. In some embodiments, said end section comprises said feed end.

Typically, a support structure is coupled between said body and said conveyor, and may have a first end coupled to said body at a location spaced apart from, preferably substantially below, the location where said discharge end is coupled to said body, and a second end coupled to said conveyor substantially at said feed end.

In some embodiments, said support structure is operable between an extended state and a retracted state, said support structure being longer in said extended state than in said retracted state, and wherein extension and retraction of said support structure cause, respectively, said conveyor to be raised and lowered with respect to said body.

Optionally, said support structure is operable between an extended state and a retracted state, said support structure being longer in said extended state than in said retracted state, and wherein extension and retraction of said support structure cause or facilitate, respectively, said end section to be unfolded and folded with respect to said main section.

Typically, said conveyor is coupled to the body by lifting means configured to raise or lower the conveyor with respect to the body, wherein said lifting means may be operable to raise or lower the conveyor before, after and/or during movement between the deployed and transport states.

A second aspect of the invention provides a material processing apparatus comprising a body, and a conveyor that is movable between a deployed state and a transport state, wherein the conveyor comprises a feed end, a discharge end and conveying means configured to carry material from said feed end to said discharge end, and wherein one of said discharge end or said feed end is coupled to said body and, in said deployed state, said conveyor extends from said body with the other of said discharge end or said feed end being spaced apart from said body by said conveying means, said one of said discharge end or said feed end being raised with respect to said other of said discharge end or said feed end and, in said transport state, said conveyor is folded with respect to the body such that at least part of said conveyor is located on top of said body.

Preferred features are recited in the dependent claims.

Further advantageous aspects of the invention will become apparent to those ordinarily skilled in the art upon review of the following description of a preferred embodiment and with reference to the accompanying drawings.

BRIEF DESCRIPTION OF THE DRAWINGS

An embodiment of the invention is now described by way of example and with reference to the accompanying drawings in which.

DETAILED DESCRIPTION OF THE DRAWINGS

Figure 1:
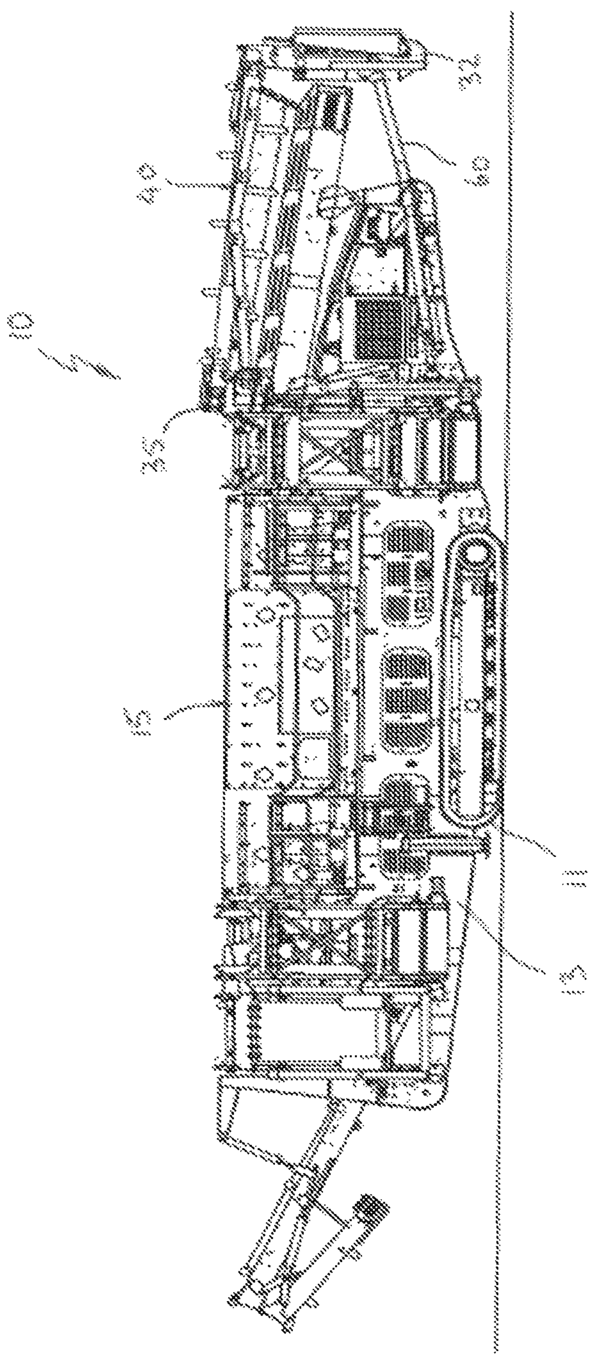
FIG. 1 is a side view of a material processing apparatus embodying the invention, the apparatus including a feed conveyor shown in a transport state.

Referring now to the drawings, there is shown, generally indicated as 10, a material processing apparatus. The apparatus 10 may be configured to perform any one or more of a plurality of processes, such as feeding, screening, separating, crushing, waste recycling or demolition and/or washing, on one or more types of aggregate or other material, for example rocks, stones, gravel, sand and/or soil, or any other material that is quarried, mined or excavated. To this end, the apparatus may include one or more material processing units adapted to perform one or more of the foregoing processes.

In typical embodiments, the apparatus 10 is mobile and comprises one or more wheels and/or tracks 11 mounted on a chassis 13. The apparatus 10 may be self-propelled and to this end may comprise a drive system (not shown), e.g. comprising an engine or electrical power plant, for driving the wheels/tracks 11. In any event, the apparatus 10 may include a power plant 9, which may comprise at least some components of the drive system and/or other apparatus for powering the apparatus, e.g. electrical, hydraulic and/or pneumatic apparatus for powering rams or other devices, and may also include a control unit (not shown). The control unit is configured for controlling the apparatus, including causing the apparatus 10 to adopt the modes described hereinafter, and may include manually operable controls and/or be adapted to allow remote control by an operator.

Figure 2:
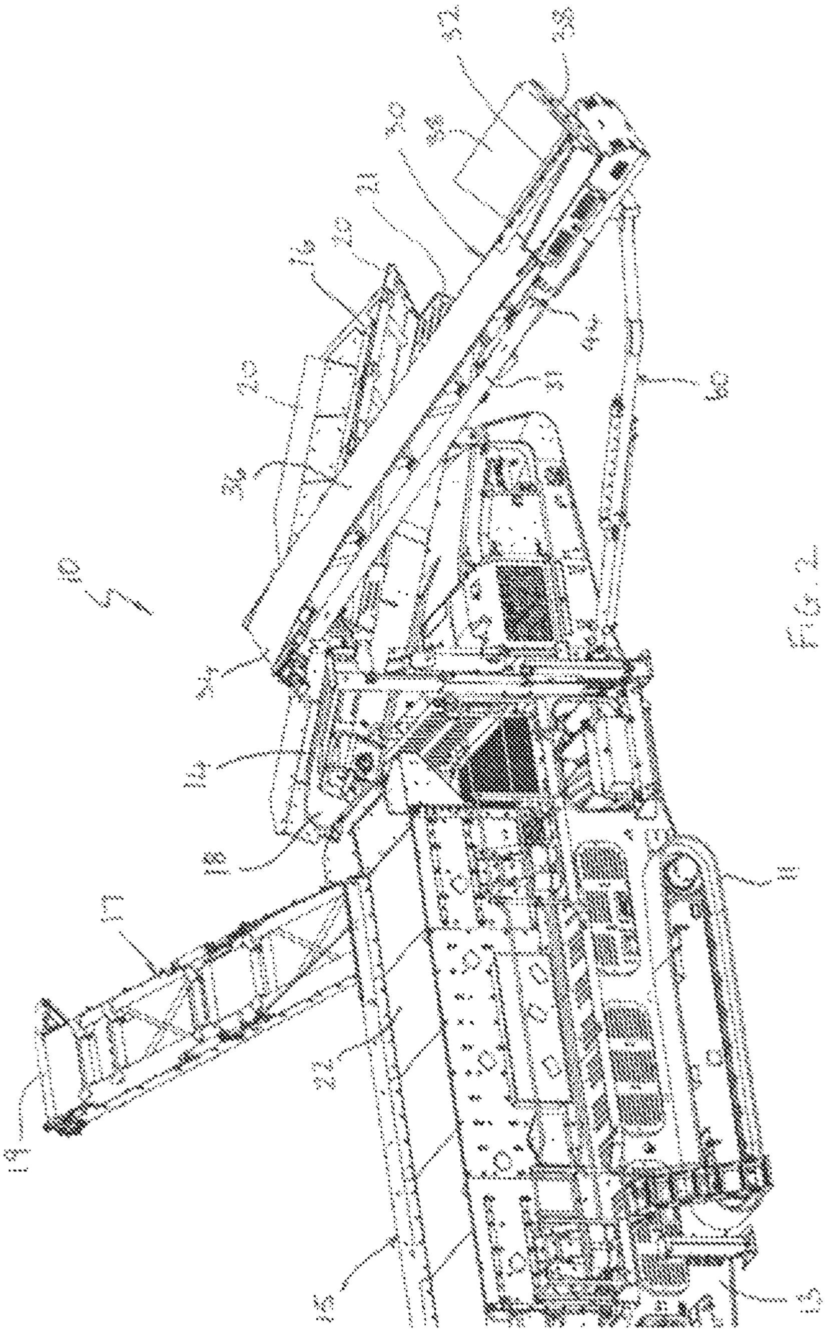
FIG. 2 is a perspective view of part of the apparatus of FIG. 1 with the feed conveyor shown in a deployed state.

The apparatus 10 includes a main feed conveyor 14 located at an end of the apparatus. The conveyor 14 has a feed end 16 and a discharge end 18 and is configured to convey material (not shown) in a direction towards the discharge end 18. The conveyor 14 is substantially aligned with the longitudinal axis of the apparatus 10 and so, in use, conveys material in a direction that is substantially in line or parallel with the longitudinal axis of the apparatus 10. In particular, the conveyor 14 is configured to feed material to the apparatus 10 in a direction from the end 16 towards the centre of the apparatus 10 (right to left as viewed in FIGS. 2). Typically, the main feed conveyor 14 includes one or more wall sections 20 (defining what is commonly referred to as a hopper) extending around part of the conveyor 14, typically across the end of the conveyor 14 at the feed end 16 and along at least part of each side of the conveyor. The wall sections 20 help to gather material that is deposited in use onto the feed end 16 and reduce spillage. In the illustrated embodiment, the main feed conveyor 14 is configured to feed material onto a screening apparatus 22 via its discharge end 18. In alternative embodiments one or more other material processing apparatus and/or conveyor(s) may be provided at the end 18 of conveyor 14 instead of or as well as the screening apparatus 22. The chassis 13, the power plant 9, the main feed conveyor 14 and/or any other processing apparatus (such as screening apparatus 22) form the main body 15 of the apparatus 10. The apparatus 10 typically includes one or more discharge conveyors configured to discharge processed material from the apparatus 10. For example, FIG. 2 shows one side-mounted discharge conveyor 17 in a deployed state. The conveyor 17 extends outwardly from the body 15 when deployed, having a feed end (not visible) located at the body 15 and a discharge end 19 being distal with respect to the body 15.

The apparatus 10 includes a second conveyor 30 which, in preferred embodiments, is a feed conveyor configured to feed material to the apparatus 10. The conveyor 30 has a feed end 32 (commonly referred to as the tail), a discharge end 34 (commonly referred to as the head) and conveying means 36 configured to convey material from the feed end 32 to the discharge end 34. In the present example, the conveying means 36 comprises a conveying belt but it could alternatively comprise other conveying mechanisms. The conveyor 30 typically comprises a support frame 31 for the conveying means 36. In the present example, the frame 31 carries troughing rollers 33 for shaping the conveying belt 36, and end rollers 35 (only one visible) at each end around which the belt 36 runs. At least one of the rollers 35 is driven in use by any convenient drive means 37, e.g. a motor.

Typically, the second feed conveyor 30 includes one or more wall sections 38, defining what may be referred to as a hopper, extending around part of the conveyor 30, typically across the end of the conveyor 30 at the feed end 32 and along at least part of each side of the conveyor 30. The structure formed by the walls 38 is sometimes referred to as a feed boot and is intended to gather material deposited onto the feed end 32 so that it may be conveyed to the discharge end 34. The discharge end 34 is open-ended such that material conveyed along the conveyor 30 can be discharged therefrom.

Figure 4:
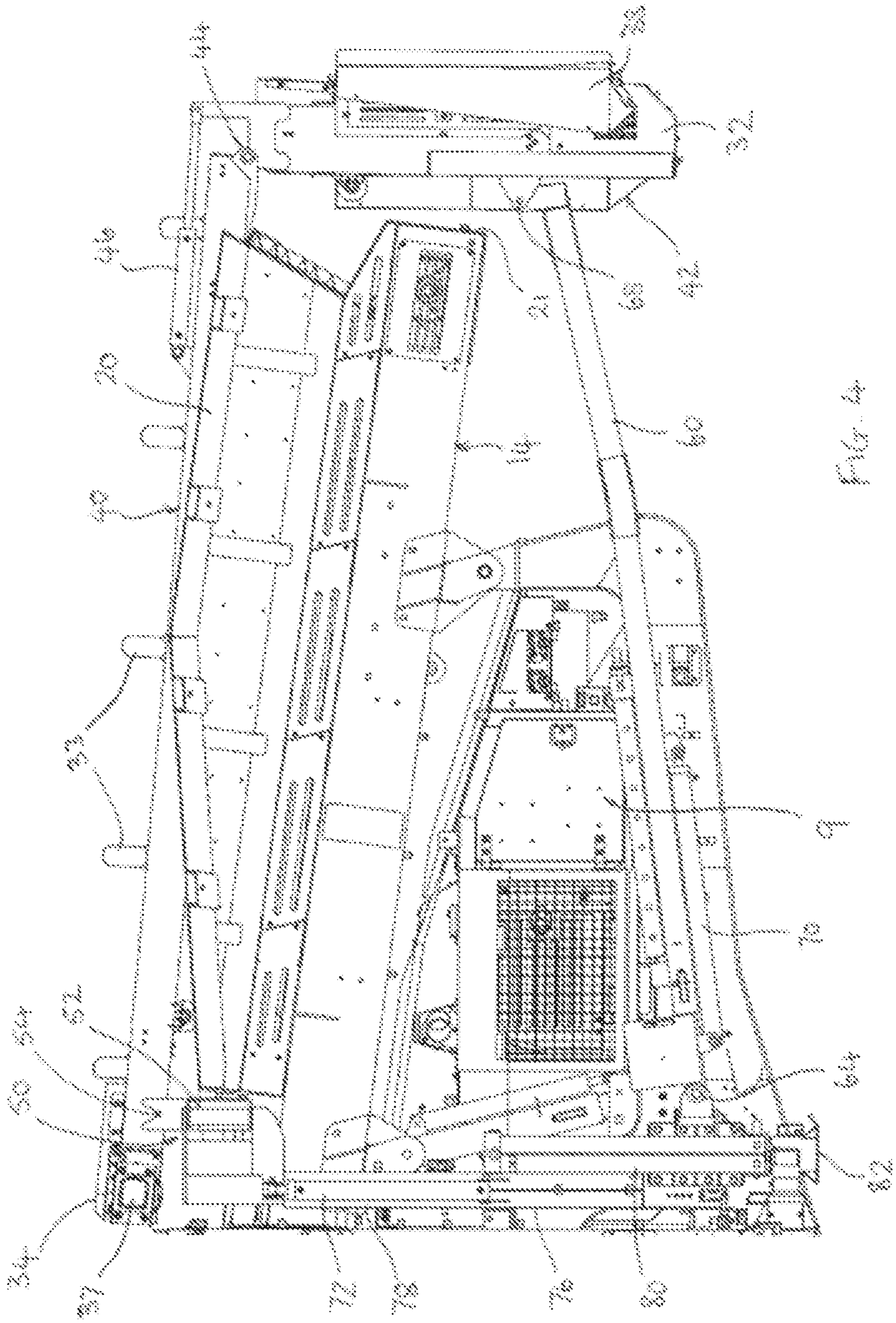
FIG. 4 is a side view of part of the apparatus of FIG. 1 with the feed conveyor shown in the transport state.
Figure 5:
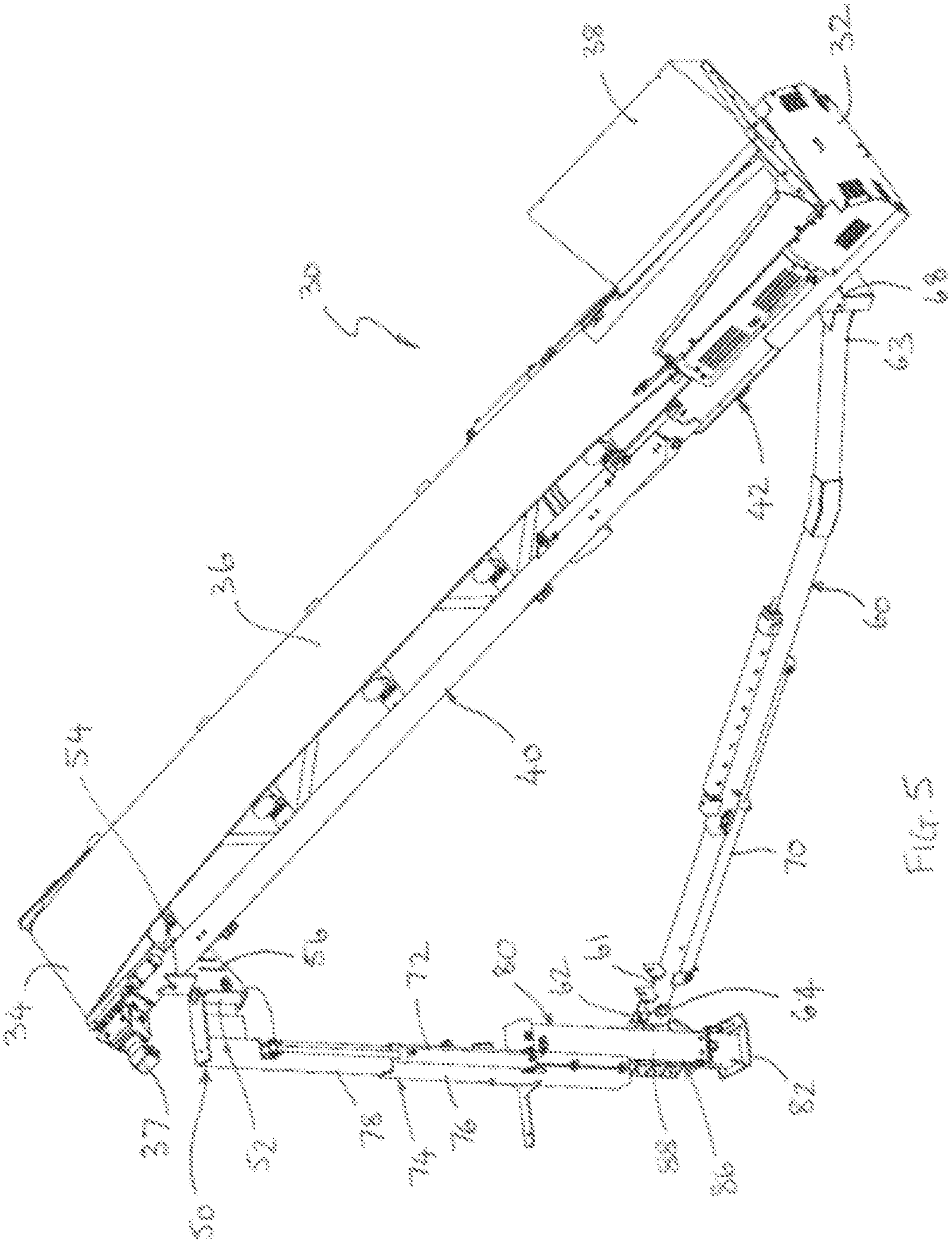
FIG. 5 is a perspective view of the feed conveyor in the deployed state.

The second feed conveyor 30 is movable between a transport state (shown in FIGS. 1, 3 and 4) and a deployed state (shown in FIGS. 2 and 5). In the deployed state, the conveyor 30 extends outwardly from the body 15 of the apparatus 10 with its discharge end 34 located at (proximal) the body 15 and its feed end 32 located away from (distal) the body 15.

In the deployed state, the discharge end 34 is typically located over a material-receiving part of the apparatus 10 such that material discharged from the conveyor 30 is received by the material-receiving part. In the illustrated embodiment, the discharge end 34 is located over the main feed conveyor 14 and so, in use, material discharged from the conveyor 30 is received by the main conveyor 14. In alternative embodiments, the discharge end 34 may be positioned, in the deployed state, to deposit material onto or into any other material processing part of the apparatus, for example a conveyor, crusher, separator, screen or washer, or onto the ground or a stockpile. Typically, the conveyor 30 is inclined when deployed, with the discharge end 34 being raised with respect to the feed end 32.

In the transport state, the conveyor 30 is folded against the body 15 of the apparatus 10, preferably such that the feed end and conveying means do not project or extend from the body, at least not laterally. In this state, the conveyor 30 is in close proximity with the body 15 and may or may not be in contact with the body 15 at one or more locations. As such, the overall dimensions of the apparatus 10 are reduced in order to facilitate transport and/or storage of the apparatus 10. In particular, in moving between the transport and deployed states, the feed end 32 moves between a distal position in which it is relatively far from the body 15 and a proximal position in which it is relatively close to the body 15. Advantageously, the conveyor 30 is pivotably coupled to the body 15 to allow pivoting movement between the transport and deployed states. Preferably, the conveyor 30 is pivotable about one or more locations that are at or substantially at the discharge end 34.

In the preferred embodiment, in the transport state, at least part of the conveyor 30 is located on top of the body 15. For example, depending on the length of the conveyor 30 and/or on the location at which it is coupled to the body 15, the whole length of the conveyor 30 (between and including the ends 32, 34) may be located on top of the body 15, and one end (the feed end 34 in this example) may or may not overhang or otherwise project beyond the end 21 of the body 15. In the illustrated embodiment, in the transport state the conveyor 30 is located on top of the main feed conveyor 14.

In the illustrated embodiment, the conveyor 30 has a main section 40 and an end section 42 that is foldable with respect to the main section 40. The end section 42 comprises the end of the conveyor 30 that is furthest away from the body 15 when deployed, in this case the feed end 32, the main section 40 include the other end (in this case the discharge end 34) and the rest of the conveyor 30. The preferred arrangement is such that, in the transport state, the main section 40 is located on top of the body 15, and the end section 42 is foldable to extend obliquely or perpendicularly with respect to the main section 40. Advantageously, the end section 42 when folded and in the transport state extends downwardly from the top of the body 15 alongside the end 21 of the body 15. It may alternatively extend upwardly from the top of the body 15 but this is less desirable as it may contribute to the overall height of the apparatus 10.

Any convenient folding mechanism may be provided to allow the end section 42 of the conveyor 30 to fold with respect to the main section 40. For example, the support frame 31 includes a hinge 44 for this purpose. Preferably, one or more powered actuators, preferably linear actuators, for example hydraulic rams 46, are coupled between the main section 40 and end section 42 and configured to fold and unfold the sections 40, 42 relative to one another.

The pivotable coupling between the conveyor 30 and the body 15 is generally indicated as 50. The coupling is configured to allow the conveyor 30 to pivot about an upright axis, i.e. an axis that is substantially perpendicular to both the longitudinal and transverse axes of the body 15, which is substantially vertical when the apparatus 10 is on a horizontal surface. This allows the conveyor 30 to pivot inwardly and outwardly with respect to the body 15. The illustrated coupling 50 includes pivot joint 52 for this purpose. In the preferred embodiment, the coupling 50 is also configured to allow the conveyor 30 to pivot about a transverse axis that is substantially perpendicular to said upright axis and which is substantially horizontal when the apparatus 10 is on a horizontal surface. This allows the conveyor 30 to pivot upwardly and downwardly. The illustrated coupling 50 includes pivot joint 54 for this purpose.

The preferred coupling 50 includes a support member in the convenient form of a bar 56, which is pivotably coupled to the body 15 via pivot joint 52. The conveyor 30 is pivotably coupled to the bar 56 via pivot joint 54, typically at a location that is at or substantially at the discharge end 34. Hence the upright pivot axis is laterally adjacent the conveyor 30, preferably at the discharge end 34.

A support structure, or stay 60, is coupled between the body 15 and the conveyor 30, conveniently at respective ends 61, 63. The stay 60 supports the conveyor 30, particularly when deployed and when moving between the deployed and transport states. Advantageously, the stay 30 helps to control the movement of the conveyor 30 between the deployed and transport states. The stay 60 is pivotably coupled to the body 15 to allowing pivoting movement about the upright axis, or an axis substantially parallel therewith. In the illustrated embodiment, this is achieved by pivot joint 62. The stay 60 is preferably also pivotably coupled to the body 15 to allowing pivoting movement about a transverse axis, substantially perpendicular to the upright axis and substantially parallel with the transverse axis about which the conveyor 30 is pivotable. In the illustrated embodiment, this is achieved by pivot joint 64.

The stay 60 is coupled, typically pivotably coupled, to the conveyor 30 at any suitable location, usually at or substantially at the feed end 32. The pivot axis typically runs transversely of the conveyor 30 and in the preferred embodiment is substantially parallel with the pivot axis of hinge 44. In the illustrated embodiment, this is achieved by pivot joint 68.

In preferred embodiments, the stay 60 is extendible and retractable, for example telescopically, so that its length between ends 61, 63 can be increased or decreased. This facilitates movement of the conveyor 30 between the transport and deployed states. Advantageously, one or more powered actuators, preferably linear actuators, e.g. a hydraulic ram 70, is coupled between parts of the stay 60 that are movable with respect to each other in order to effect extension and retraction. Typically, the stay 60 adopts a relatively extended state when the conveyor 30 is in the deployed state and a relatively retracted state when the conveyor 30 is in the transport state. In the illustrated embodiment, extension of the stay 60 has the effect of raising the conveyor 30, and in particular its end 32, relative to the body 15, while retraction of the stay 60 has the effect of lowering the conveyor 30, and in particular its end 32, relative to the body 15. Optionally, extension and retraction of the stay 60 may effect, assist and/or facilitate unfolding and folding, respectively, of the end section 42. In the illustrated embodiment, however, folding and unfolding of the end section 42 is effected by the actuator 46, in which case extension or retraction of the stay only serves to raise or lower the conveyor irrespective of whether the end section 42 is folded or unfolded.

In the illustrated embodiment, during movement of the conveyor 30 from the deployed state to the transport state, extension of the stay 60 has the effect of pivoting the conveyor 30 upwardly about pivot joint 54 to facilitate it being located on top of the body 15. During movement of the conveyor 30 from the transport state to the deployed state, retraction of the stay 60 has the effect of pivoting the conveyor 30 downwardly about pivot joint 54 to facilitate its deployment. Some extension and retraction of the stay 60 may be required to facilitate unfolding and folding, respectively, of the end section 42. This is typically in addition to the extension and retraction of the stay required to raise and lower the conveyor 30. Alternative means, e.g. one or more actuators, for pivoting the conveyor 30 about joint 54 may be provided. Alternatively, or in addition, if necessary one or more portions of the body 15, for example the main feed conveyor 14, may be lowered to facilitate positioning the conveyor 30 on top of the body 15, and raised when the conveyor 30 is deployed.

In preferred embodiments, the conveyor 30 is located at a side of the apparatus 10 and projects laterally from the side when deployed. In the transport state, the conveyor is preferably substantially aligned with the longitudinal axis of the body, i.e. the main axis of the conveyor runs substantially longitudinally of the body 15.

Optionally, the conveyor 30 is coupled to the body 15 by lifting means configured to raise or lower the conveyor 30, and in particular its end 34, with respect to the body 15. Conveniently, the lifting means is incorporated into the pivotable coupling 50. In the illustrated embodiment, the lifting means comprises one or more powered actuators, preferably linear actuators, for example a hydraulic ram 72, coupled to an extendible support 74. The extendible support 74 may comprise a base member 76 and an extendible member 78, conveniently in the form of telescopically coupled posts. The extendible post 74 carries the pivot joints 52, 54 and support bar 56. The lifting means is operable to raise or lower the conveyor 30, as required, before, after and/or during movement between the deployed and transport states. This allows the conveyor to be lifted over one or more other components of the apparatus 10 as necessary, for example the wall sections 20.

Optionally, the apparatus 10 may include one or more jacks 80 (only one shown but typically a similar jack is provided on the other side of body 15 substantially in line with jack 80) extendible into and out of a ground-engaging state in which a foot 82 of the jack 80 engages the ground, in use, to stabilize the apparatus 10. In the illustrated embodiment, the jack 80 comprises one or more powered actuators, preferably linear actuators, for example a hydraulic ram 84, coupled to an extendible support 86. The extendible support 86 may comprise a base member 88 and an extendible member (not visible) which carries the foot 82, conveniently in the form of telescopically coupled posts.

Figure 3:
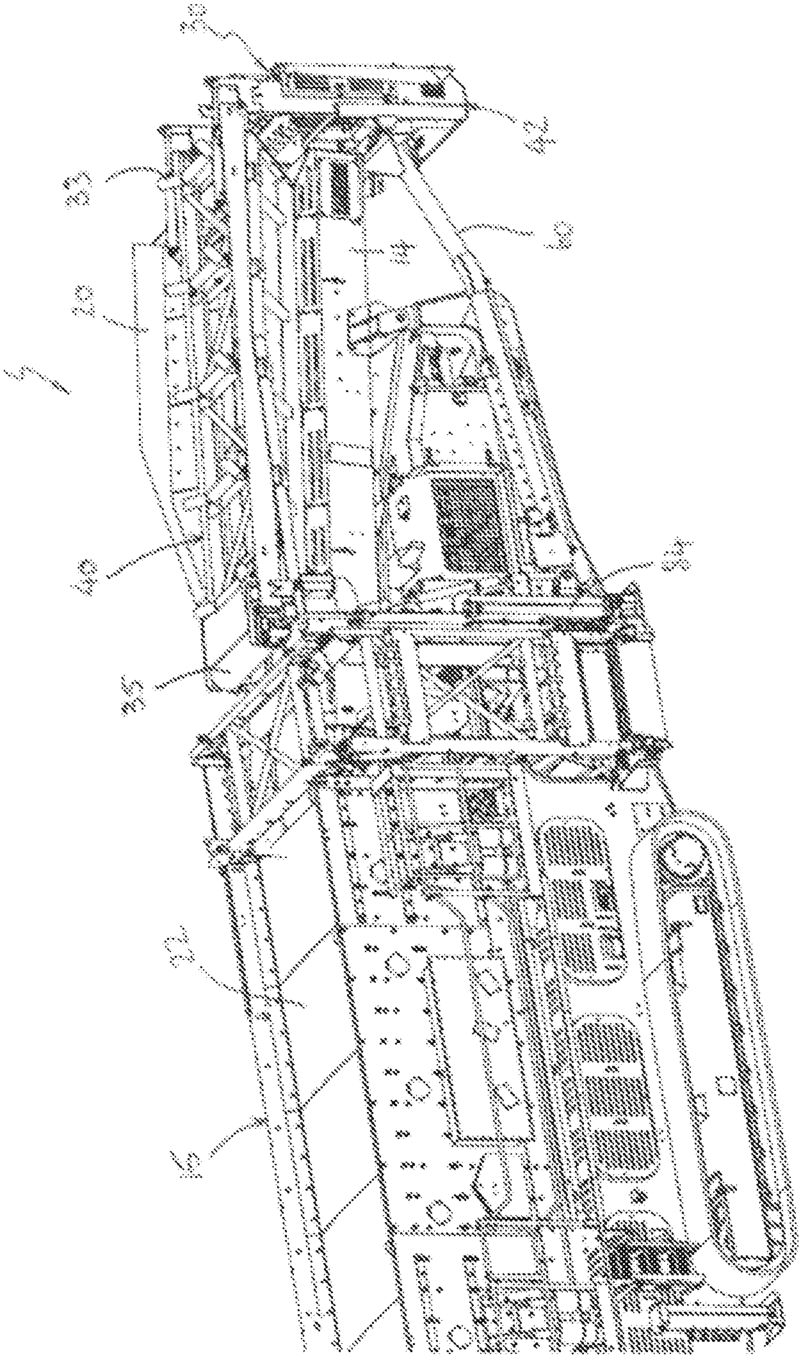
FIG. 3 is a perspective view of part of the apparatus of FIG. 1 with the feed conveyor shown in the transport state.

During use of the illustrated embodiment, starting from the transport state shown in FIGS. 3 and 4, the end section 42 is unfolded by operation (in this case retraction) of actuator 46, which may be facilitated by extension of stay 60 if required. Further extension of stay 60 raises the conveyor 30 at its end 32 with respect to the body 15. Operation (in this case extension) of actuator 72 raises the conveyor 30 at its end 34 with respect to the body. The conveyor 30 may then be swung outwardly from the body 15 towards the deployed state (this may for example be effected manually). Subsequent retraction of the stay 60 causes the conveyor 30, in particular its end 32, to be lowered to the desired height for the deployed state. This height is adjustable by adjusting the relative extension or retraction of the stay 60. The conveyor 30, in particular its end 32, may be lowered by the actuator 72. Hence, the deployed state is adopted. To move the conveyor 30 from the deployed state to the transport state, the reverse of these actions may be effected, In alternative embodiments (not illustrated), the actuator 46 may be omitted and the folding and unfolding of the end section 42 may be effected by retraction and extension (respective) of the stay 60. In such cases, starting from a relatively retracted state with the end section folded (e.g. the transport state), a first extension of the stay 60 may effect unfolding of the end section 42 and a subsequent extension may raise the conveyor 30, in particular its end 32, with respect to the body 15. Starting from a relatively extended state with the end section unfolded (e.g. during movement from the deployed state to the transport state), a first retraction of the stay 60 may effect a lowering of the conveyor 30, in particular its end 32, while subsequent retraction may effect folding of the end section 42.

It will be understood that aspects of the embodiment described above may be used in embodiments where the conveyor 30 is a discharge conveyor rather than a feed conveyor.

The invention is not limited to the embodiments described herein which may be modified or varied without departing from the scope of the invention.

The invention claimed is:

1. A material processing apparatus comprising a body, and a feed conveyor that is movable between a deployed state and a transport state, wherein the feed conveyor comprises a feed end, a discharge end and conveying means configured to carry material from said feed end to said discharge end, and wherein said discharge end is pivotably coupled to said body and, in said deployed state, said feed conveyor extends from said body with said feed end being spaced apart from said body by said conveying means and, in said transport state, said feed conveyor is folded with respect to the body, wherein the feed conveyor is pivotably movable between said deployed state and said transport state by the pivotable coupling of said discharge end, and wherein said body includes a second conveyor, and wherein, in the deployed state, said discharge end of said feed conveyor is positioned over said second conveyor in order to discharge material from said feed conveyor onto said second conveyor, said second conveyor being an in-feed conveyor configured to feed material to said material processing apparatus, and wherein said material processing apparatus is operable in a feeding mode in which said feed conveyor is in said deployed state and deposits material onto said second conveyor.

2. An apparatus as claimed in claim 1, wherein in said transport state, a main axis of said feed conveyor runs substantially longitudinally of said body.

3. An apparatus as claimed in claim 1, wherein in said transport state at least part of said feed conveyor is located on top of said body.

4. An apparatus as claimed in claim 1, wherein, in the deployed state, said discharge end is raised with respect to said feed end.

5. An apparatus as claimed in claim 1, wherein said feed conveyor comprises and end section that is foldable with respect to a main section and wherein, when said feed conveyor is in said deployed state, said end section is in an unfolded state and, when said feed conveyor is in said transport state, said end section is in a folded state.

6. An apparatus as claimed in claim 5, wherein, in said transport state, said main section runs substantially longitudinally of said body and said end section extends obliquely or perpendicularly with said main section.

7. An apparatus as claimed in claim 5, wherein, in said transport state, said main section is located on top of said body.

8. An apparatus as claimed in claim 5, wherein, in said transport state, said end section extends alongside an end of said body.

9. An apparatus as claimed in claim 5, wherein said end section comprises said feed end.

10. An apparatus as claimed in claim 5, further including a support structure coupled between said body and said feed conveyor.

11. An apparatus as claimed in claim 10, wherein said support structure has a first end coupled to said body at a location spaced apart from the location where said discharge end is coupled to said body, and a second end coupled to said feed conveyor substantially at said feed end.

12. An apparatus as claimed in claim 10, wherein said support structure is operable between an extended state and a retracted state, said support structure being longer in said extended state than in said retracted state, and wherein extension and retraction of said support structure cause, respectively, said feed conveyor to be raised and lowered with respect to said body.

13. An apparatus as claimed in claim 10, wherein said feed conveyor comprises and end section that is foldable with respect to a main section and wherein, when said feed conveyor is in said deployed state, said end section is in an unfolded state and, when said feed conveyor is in said transport state, said end section is in a folded state, and wherein said support structure is operable between an extended state and a retracted state, said support structure being longer in said extended state than in said retracted state, and wherein extension and retraction of said support structure cause or facilitate, respectively, said end section to be unfolded and folded with respect to said main section.

14. An apparatus as claimed in claim 1, wherein said feed conveyor is coupled to the body by lifting means configured to raise or lower the feed conveyor with respect to the body.

15. An apparatus as claimed in claim 1, wherein said lifting means is operable to raise or lower the feed conveyor before, after and/or during movement between the deployed and transport states.

16. An apparatus as claimed in claim 1, wherein said feed conveyor extends from a side of said body in said deployed state.

17. An apparatus as claimed in claim 1, wherein said discharge end is located substantially at the top of said body.

18. An apparatus as claimed in claim 1, wherein said coupling of the discharge end to said body allows said feed conveyor to pivot inwardly and outwardly with respect to said body about an upright axis, and to pivot upwardly and downwardly about a traverse axis that is substantially perpendicular to said upright axis.

19. An apparatus as claimed in claim 1, wherein said second conveyor is substantially aligned with the longitudinal axis of the apparatus.

* * * * *